Oct. 28, 1952 A. G. MIES ET AL 2,615,352
TRANSMISSION FOR FISHING REELS
Filed Aug. 15, 1947
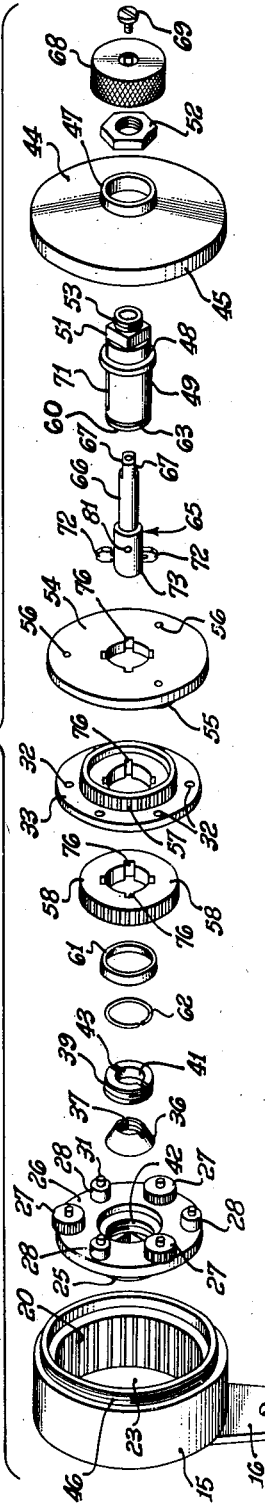
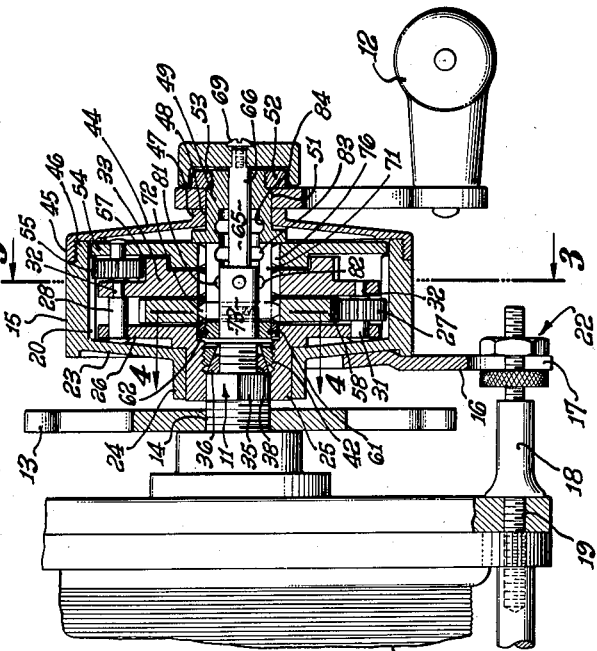
INVENTORS.
ALEXANDER G. MIES,
BY TED S. PFLUEGER,
ATTORNEY.

Patented Oct. 28, 1952

2,615,352

UNITED STATES PATENT OFFICE 2,615,352

TRANSMISSION FOR FISHING REELS

Alexander G. Mies, Alhambra, and Ted S. Pflueger, Altadena, Calif.; said Mies assignor to said Pflueger Application August 15, 1947, Serial No. 768,758

2 Claims. (Cl. 74—785)

This invention relates to fishing reels and, more particularly but not necessarily, to a speed changing device or transmission for a fishing reel for selectively varying the speed of the crank relative to the speed of the spool or shaft of the reel.

It is desirable on many occasions while fishing in either salt or fresh water to vary the speed of the reel crank relative to the shaft carrying the spool of the reel. In deep sea fishing it is especially desirable to reduce the speed of the spool relative to the reel crank. By reducing the speed of the spool relative to the crank considerable pumping of the fishing rod is obviated and a fish may be drawn in by the excess leverage afforded by the differential between the crank and the spool. Also, the low speed is very desirable when a large fish is to be brought along the side of a boat for retrieving the fish. There are certain other occasions when a game fish hooked on a line will change direction and make a run directly at the fisherman, thereby requiring that the line be very rapidly reeled in order to take up the slack.

In the fresh water fishing the low speed of the reel relative to the crank is seldom desired, but the direct speed between the reel and the crank and especially the high speed of the reel relative to the crank is desirable. Most fresh water fish are relatively small and again the fisherman often desires to retrieve his hook in order to change or provide the hook with bait. Various and sundry types of mechanisms have heretofore been provided for changing the ratio of the speed of the crank or handle of the fishing reel with the speed of the spool, some of which are gear shifts and others hydraulic or otherwise operated. Such constructions have been found to be at the expense of the strength of the reel and do not operate with the smoothness required by a skilled operator. Moreover, prior constructions involved changes in the body of the reel, were bulky, heavy, expensive and in most instances the advantageous features of standard reels were lost by the inclusion of speed changing arrangements.

It is, therefore, a primary object of this invention to provide a speed changing attachment or differential for a fishing reel that may be installed on the shaft of conventional reels of standard types.

Another object is to provide a manually operated speed changing attachment or differential of the gear type wherein different ratios of speed may be selectively obtained between the crank and spool of the reel without disturbing the mesh of the gears.

Another object is to provide a novel speed changing device or transmission which may be easily and quickly attached to the shaft of a conventional fishing reel and which will provide means for quickly changing the speed differential between the crank of the reel and the shaft of the reel.

Another object of the invention also is to provide a transmission for fishing reels that may be attached to the shaft of a conventional reel without altering or interfering with the free spool mechanism, the drag or friction clutch usually carried by such reels.

Another object is to provide a speed changing attachment for fishing reels that may be selectively operated by manually shifting an actuating shaft axially relative to the shaft of the reel and the speed changing attachment.

A further object is to provide an attachment having the above characteristics that will be compact, self-contained, rugged, efficient in operation and comparatively cheap to manufacture.

A still further object is to provide a fishing reel having a speed changing attachment which will operate to produce a plurality of speed ratios between the crank of a reel and the spool thereof, which means may be readily altered to produce any combination of speed ratios between the crank and the reel by merely eliminating certain operating parts of the device.

The above-mentioned and other objects will be made apparent throughout the further description of the invention when taken in connection with the accompanying drawings, wherein like reference characters refer to like parts. The drawings are not a definition of the invention but merely illustrate and describe an exemplary form by means of which the invention may be effectuated.

In the drawings:

Fig. 1 is an exploded view of an attachment of a speed changing device embodying the invention.

Fig. 2 is a partial end elevational view of a reel having the present device embodying the invention fixed to the shaft of the reel, the present device being shown in vertical section.

Fig. 3 is a sectional view taken along the line III—III of Fig. 2.

Fig. 4 is a sectional view taken along the line IV—IV of Fig. 2.

The present device is similar in principle to the speed changing device illustrated and described in patent application, Serial No. 733,772, filed March 11, 1947, now Patent No. 2,487,387. The principal difference in the present device disclosed in the above-mentioned application is the construction and the arrangement of parts to simplify the device and provide a manually operated speed changing means which may be actuated instantaneously to obtain the desired speed differential between the crank handle and the spool of the reel.

Referring to the drawings, a fishing reel, represented in its entirety by 10, is shown with the present device mounted on the conventional driving shaft 11, from which the crank handle 12 has been removed. The extreme end of shaft 11 is shown of reduced diameter and threaded; adjoining this is a squared portion and this is followed by the externally threaded portion 14 of larger diameter. A conventional drag 13 is mounted on the threaded portion 14 of the shaft 11 and is adapted for its usual purpose without any interference with the present device. The present device includes a cylindrical housing 15, which is held stationary with the reel structure by means of a lever 16 having an elongated slot 17 in its outer end for receiving the end of a stud 18. The stud 18 has a threaded end 19 which may be substituted for one of the reel-retaining screws 21. The slot 17 is elongated for the purpose of adjustment when the attachment is used on reels of different diameter, the adjustment being made by the threaded means, indicated in its entirety by 22, carried by the outer end of the stud 18.

The rear end of the housing 15 is partially closed by a transverse wall 23 which may be integral with the cylindrical housing 15. The annular end wall 23 carries a tubular member 24 concentric with the cylindrical housing and shaft 11 and arranged to operate as an outer bearing surface for a tubular output member 25. The tubular output member 25 is provided with a cylindrical flange 26 arranged to support radially disposed, spaced, planetary gears 27 and spacer members 28. The gears 27 and spacer members 28 are rotatably carried by pins 31 projecting from the face of the flange 26. The pins 31 terminate outwardly from the gears 27 and spacer members 28 and are arranged to be received by openings 32 provided in a disc 33, the purpose of which will be later understood. The planetary gears 27 are positioned on the disc 26 so that the gear teeth will extend outwardly from the peripheral edge of the flange or disc 26 and mesh with an internal gear 20 formed in the inner surface of stationary housing 15.

The tubular member 25 on the flange 26 is provided with a non-circular or square opening at its outer end for receiving the non-circular or square portion 35 on the shaft 11 from which the crank 12 has been removed. For the purpose of fixing the tubular member 25 and flange 26 rigid with the shaft 11, there is provided a frusto-conical-shaped nut 36, having its outer end bifurcated at 37 for cooperation with a tool for tightening the nut 36. The nut 36 is threaded onto the end of the shaft 11 as shown at 38 in Fig. 2. For the purpose of locking the nut 36 in rigid, fixed relation with the shaft and tubular member 25 there is provided an externally threaded nut 39 having a frusto-conical-shaped opening 41 therein for receiving the frusto-conical-shaped nut 36. The tubular member 25 is internally threaded at 42 for receiving the externally threaded nut 39. The externally threaded nut 39 is bifurcated at 43 to cooperate with the bifurcation 37 in the nut 36 whereby the nuts 36 and 39 may be brought into locking relation with the shaft 11 and tubular member 25.

The outer end of the housing 15 is provided with the cover 44, the periphery of which terminates in an inwardly extending, internally threaded flange 45 adapted to engage the externally threaded, reduced portion 46 of the housing 15. The cover 44 is provided with a centrally located lip 47 arranged to receive the cylindrical portion 48 of a tubular jack shaft 49. The present device has been designed so that the conventional handle 12 may be employed with the present construction. The tubular jack shaft 49 is provided with a non-circular or square portion 51 arranged to fit a corresponding opening in the end of the crank 12, the crank 12 being employed to rotate the jack shaft 49.

A nut 52 is provided for threaded engagement with the reduced, externally threaded end portion 53 of the jack shaft 49 for maintaining the handle in assembled relation. Assembled on the jack shaft 49 is a disc 54, the latter being provided on its side face with planetary gears 55. The planetary gears are radially disposed about the center of the disc 54 and supported thereon by pins 56 and arranged to mesh with internal gear 20. The jack shaft 49 also carries disc 33, the latter being provided with a central opening for receiving the shaft 49. Also disposed on the disc 33 is a sun gear 57 concentric with the shaft 49 and arranged to mesh with the planetary gears 55 carried by the disc 54. The shaft 49 also carries sun gear 58 arranged to mesh with the planetary gears 27 carried by the disc or flange 26. A locking ring 61 is provided on the inner end of the shaft 49 and arranged to cooperate with an annular flange 60 on shaft 49 for locking the discs 54 and 33 and gear 58 in assembled relation on the shaft 49. A spring-locking washer 62 may be positioned in an external groove 63 provided in the end of the shaft 49 for maintaining the locking washer 61 in assembled relation on the shaft.

For the purpose of selectively obtaining different speed ratios between the handle 12 and the shaft 11 there is provided a manually operated, actuating pin, represented in its entirety by 65. The pin 65 is disposed within the tubular shaft 49 and is provided with a reduced portion 66, the end of which is reduced on opposite sides, as shown at 67, for receiving a corresponding opening in a button or actuating knob 68, the outer end of the reduced portion 66 being bored and internally threaded for receiving a locking screw 69 for maintaining the knob 68 in rigid, fixed relation with the pin 65. The tubular shaft 49 is provided with elongated slots 71 for receiving and accommodating oppositely disposed, spring-actuated pawls 72. The pawls 72 are positioned in a transverse opening 70 provided through the outer end 73 of the pin 65 (see Fig. 4). The adjacent ends of the pawls 72 are bifurcated to form a chamber 74 for receiving a spring 75, the latter employed to urge the oppositely disposed pawls 72 outwardly for selectively engaging recesses or notches 76 provided in the central openings in the disc 54, disc 33 or gear 58. Means may be provided for releasably holding the pin 65 in its several axial positions within the tubular shaft 49. Such means may include outwardly projecting, spring-held, radially disposed positioning elements or projections 81 in the portion 73 of the pin 65 arranged to engage grooves 82, 83 and 84 when the pawls 72 are in engagement with the recesses or notches 76 in the gear 58, disc 33 and disc 54, respectively.

It can now be understood that by axially shifting the pin 65 to engage the pawls 72 with the recessed notch 76 in either the disc 54, disc 33 or gear 58, the desired differential between the crank 12 and shaft 11 may be obtained. The operation of the device is as follows. When it is desired to reduce the speed of the reel relative to the crank 12, the pin 65 is positioned by the button 68 to its innermost position, as shown in Fig. 2, at which time the pawls 72 engage the recesses 76 in the sun gear 58, the latter meshing with the planetary gears 27 on the disc 26, which is rigidly carried by the shaft 11. When it is desired to obtain direct one-to-one ratio between the crank 12 and the shaft 11, the pawls 72 are shifted by means of the knob 68 to the recesses 76 in the disc 33, and since the latter is connected directly by means of the pins 31 with the disc 26 which is rigidly carried by the shaft 11, the shaft 11 will be rotated in unison with the crank 12. When it is desired to obtain a high speed of the reel or spool 10 relative to the crank 12, then the pawls 72 are shifted to the recesses 76 in the disc 54, at which time the shaft 11 will be rotated by way of the planetary gears 55 carried by the disc 54, sun gear 57, carried by the disc 33, the latter being rigidly fixed with the disc 26, as above explained.

As pointed out above, all of the speed ratios are not required under certain types of fishing. Therefore, this invention contemplates the use of only certain parts of the present device to construct speed changing devices which will provide only the normal ratio between the crank 12 and shaft 11 and the low speed of the shaft relative to the crank. Other devices will include only the low and high speed ratios between the shaft 11 and crank 12 and still others may utilize only those parts for effecting a direct drive between the crank 12 and shaft 11 and high speed ratios between the shaft 11 and crank 12. When the low speed is not desired it is only necessary to delete from the structure the gear 58, planetary gears 27, spacers 28 and pins 31. When the direct drive or one-to-one ratio between crank 12 and shaft 11 is not desired, it is only necessary to delete the flange 33 and the recesses 76 therein. In this instance, the gear 57 may be similar to gear 58 except for the absence of the recesses 76, and when it is desired to delete the high speed ratio between the shaft 11 and crank 12 it is only necessary to delete the disc 54, planetary gears 55 and sun gear 57.

In the structures requiring only two speeds as above explained, the deletion of the unnecessary parts reduces the cost of the device and renders it more compact, lighter and smaller.

Accordingly, there is provided a transmission that may be attached to the shaft of the conventional fishing reel that will provide selected, speed ratios between the crank and the shaft of the reel without disturbing the mesh of the gears. The attachment is compact, durable, and may be instantaneously operated to provide the desired speed of the spool of the fishing reel relative to the speed of the reel crank. It will be noted that by reason of the axially movable pin 65 carrying the pawls 72 for engagement with the slots 76 in the disc 54, disc 53 or gear 58 for changing the speed ratios, an extremely compact device has been provided which may be instantaneously actuated by the knob 68 for providing the desired speed ratio. The outer diameter of housing 15 is considerably smaller than the diameter of the star drag 13 and the device in no way interferes with the conventional operation of the other portions or mechanisms of the reel.

While the present device has been illustrated and described as an attachment for a fishing reel, it will be obvious to those skilled in the art that the device may be built into the reel as standard equipment. Other changes, substitutions, additions and modifications may be made in the device without departing from the spirit and scope of the invention as defined by the appended claims.

We claim:

1. A compact transmission for use with a fishing reel comprising: a cylindrical housing having an internal gear on the inner surface thereof; a tubular input shaft carried by the housing and rotatable concentrically therein, said shaft having an axial bore therethrough, a longitudinal slot communicating with the bore and extending partially the length of the shaft, and a plurality of axially spaced circumferential grooves formed in the inner surface of the bore and axially spaced along the slot; a disc rotatably mounted on said shaft and provided with a circular central opening and a notch formed in the inner circumference defining said opening; a sun gear fixed to said disc; a second disc rotatably mounted on said shaft and provided with a central circular opening and a notch formed in the inner circumference defining said opening; a set of planetary gears rotatably carried on said second disc and meshing with said internal gear and with said sun gear; an axially movable actuating pin in the bore of said shaft and extending outwardly thereof, said pin having a pair of axially spaced radially disposed channels formed therein; a radially extending pawl carried in one of said channels and extending through said slot and outwardly thereof and resilient means within said channel urging said pawl outwardly; a rounded positioning element carried in the other channel and resilient means within said other channel for urging the element outwardly, the pawl and positioning element being engageable with a selected notch and circumferential groove respectively; means for digitally moving the actuating pin axially of the shaft; and an output member locked to said first named disc and axially spaced therefrom.

2. A compact transmission for use with a fishing reel comprising: a cylindrical housing having an internal gear on the inner surface thereof; a tubular input shaft carried by the housing and rotatable concentrically therein, said shaft having an axial bore therethrough, a longitudinal slot communicating with the bore and extending partially the length of the shaft, and a plurality of axially spaced circumferential grooves formed in the inner surface of the bore and axially spaced along the slot; a disc rotatably mounted on said shaft and provided with a circular central opening and a notch formed in the inner circumference defining said opening; an output member locked to said disc and axially spaced therefrom, said output member being provided with a radially extending flange thereon; a set of planetary gears rotatably carried on said flange and meshing with said internal gear; a sun gear rotatably mounted on said shaft and provided with a circular central opening and a notch formed in the inner circumference defining said opening; an axially movable actuating pin in the bore of said shaft and extending outwardly thereof, said pin having a pair of axially spaced radially disposed channels formed therein; a radially extending pawl carried in one of said channels and extending through said slot and outwardly thereof and resilient means within said channel urging said pawl outwardly; a rounded positioning element carried in the other channel and resilient means within said other channel for urging the element outwardly, the pawl and positioning element being engageable with a selected notch and circumferential groove respectively; and means for digitally moving the actuating pin axially of the shaft.

ALEXANDER G. MIES.
TED S. PFLUEGER.

REFERENCES CITED

The following references are of record in the file of this patent:

UNITED STATES PATENTS

| Number | Name | Date |
|---|---|---|
| 865,613 | Schreidt | Sept. 10, 1907 |
| 1,128,684 | Johanson | Feb. 16, 1915 |
| 1,464,887 | Starr | Aug. 14, 1923 |
| 1,773,699 | Wesbauer | Aug. 19, 1930 |
| 2,137,778 | McCullough | Nov. 22, 1938 |
| 2,218,838 | Alspaugh | Oct. 22, 1940 |
| 2,417,732 | Bland et al. | Mar. 18, 1947 |
| 2,487,387 | Sears et al. | Nov. 8, 1949 |

FOREIGN PATENTS

| Number | Country | Date |
|---|---|---|
| 57,953 | Sweden | Sept. 2, 1922 |
| 416,059 | Great Britain | Sept. 7, 1934 |